United States Patent [19]
Toya

[11] 4,363,935
[45] Dec. 14, 1982

[54] MOBILE RADIO TELEPHONE SYSTEM
[75] Inventor: Mitsuo Toya, Fujisawa, Japan
[73] Assignee: Hitachi, Ltd., Tokyo, Japan
[21] Appl. No.: 156,369
[22] Filed: Jun. 4, 1980
[30] Foreign Application Priority Data
  Jun. 8, 1979 [JP] Japan .................................. 54-71137
[51] Int. Cl.³ .......................................... H04M 11/00
[52] U.S. Cl. .............................. 179/2 EA; 179/1 HF
[58] Field of Search ................. 179/1 HF, 81 B, 2 E, 179/2 EA, 2 EB; 455/88, 89, 90, 95, 99, 100, 116, 345

[56] References Cited
U.S. PATENT DOCUMENTS
3,124,657 3/1964 Peterson ........................... 179/2 EA
3,377,435 4/1968 Lippert ............................. 179/2 EB
3,833,766 9/1974 Eklof et al. ....................... 179/1 HF OTHER PUBLICATIONS
Advertisement for "Free Wheeler", Orv, Nov. 1977, p. 13.

Primary Examiner—Joseph A. Popek
Attorney, Agent, or Firm—Antonelli, Terry & Wands

[57] ABSTRACT

A vehicle radio telephone system includes, in addition to a handset associated with a telephone set, a wireless microphone detachable from the telephone set and a telephone receiver comprising a speaker contained in the telephone set. When a driver drives a vehicle, the wireless microphone is placed near the driver's mouth so that the driver can transmit and receive without handling the handset.

5 Claims, 3 Drawing Figures

MOBILE RADIO TELEPHONE SYSTEM

BACKGROUND OF THE INVENTION

Mobile communication utilizes the features of wireless communication to the maximum extent. It has been widely used in public communication such as ship telephone and train telephone as well as police telephone, press telephone and taxi telephone. As the social activities diverse, needs for the mobile communication services increase. Among others, the need is high for a public mobile radio telephone system which enables telephone communication between a mobile passenger and an ordinary telephone subscriber or between mobile passengers. The public mobile radio telephone service started at St. Louis in the U.S.A. in 1949 with a small scale of ten channels using 150 MHz band. Thereafter, in 1961, investigation was made for a 400 MHz band mobile radio telephone system and the result was put into practice in 1971 at San Fernando near Los Angeles when they had an earthquake there. In 1976, as technologies were developed such as effective utilization of frequency by small zone configuration, 600 channel switching anti-vibration synthesizers, highly stable crystal oscillators, busy channel switching (tracking switching) in combination with an electronic telephone exchange and location registration, the mobile radio telephone system has come into commercial usage.

When a driver of a mobile having a mobile radio telephone system or so-called wireless telephone system installed therein receives a call from a fixed station telephone subscriber while he is driving the car, he has to operate the telephone system too. The operation of the telephone system should disturb the driving operation of the driver as little as possible. For this purpose, a telephone system with a hang-type handset in which the handset is placed near the face of the driver so that the driver need not handle the handset by hand may be advisable. In this case, however, some means is required to prevent the problem of a voice going from a speaker serving as a telephone receiver to a microphone serving as a telephone transmitter during the telephone reception and transmission. It is difficult, however, to sufficiently prevent this problem in the closed mobile space because of echo.

SUMMARY OF THE INVENTION

It is an object of the present invention to provide a highly sensitive mobile radio telephone system which does not impede driving operation and prevents the problem of a voice going from the telephone receiver to the telephone transmitter.

In accordance with the present invention, in addition to a handset associated with a telephone set, a wireless telephone receiver which is detachable from the telephone set and a speaker serving as a telephone receiver, which is contained in the telephone set, are provided. When the driver is driving a car, the wireless telephone transmitter is placed near the driver's mouth to enable the driver to transmit while preventing the problem of the sound from the speaker entering into the wireless telephone transmitter.

It is another object of the present invention to provide a mobile radio telephone system in which the wireless telephone transmitter is separable from the telephone set so that the communication with another mobile radio telephone system is enabled from a position distant from the car through the telephone set installed in that car.

DESCRIPTION OF THE PREFERRED EMBODIMENT

Figure 1:
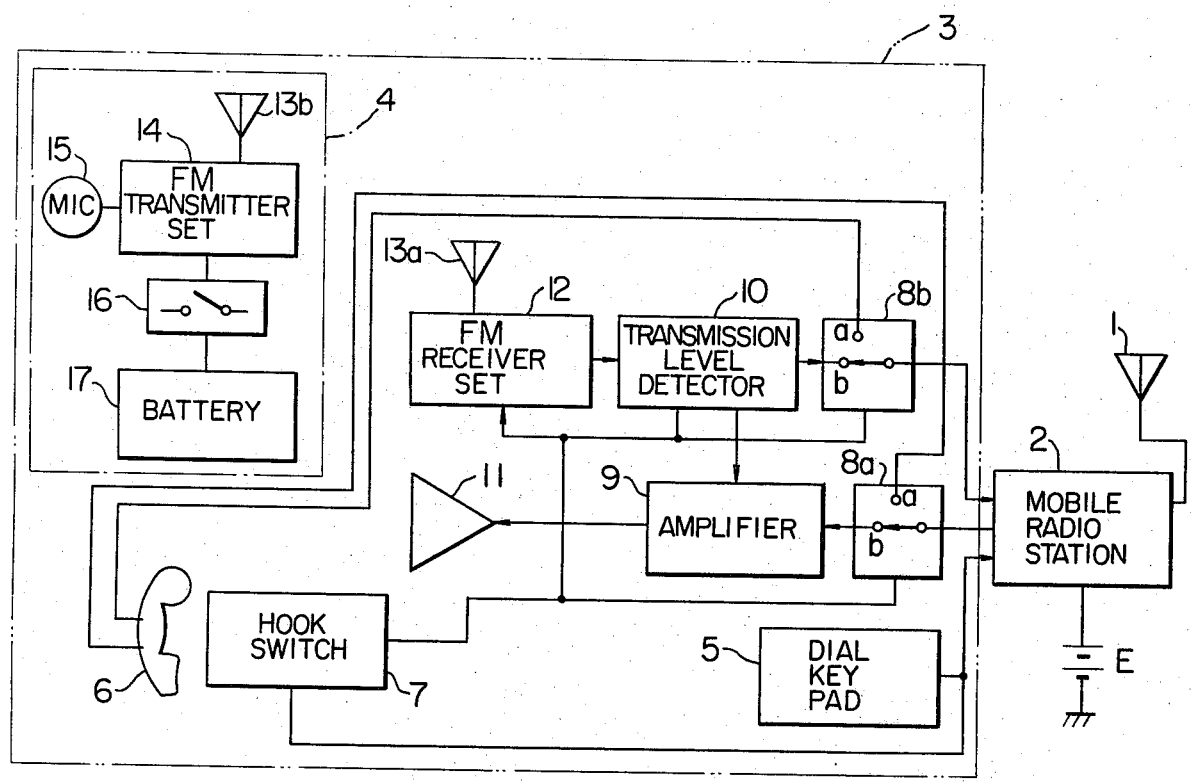
FIG. 1 shows a schematic circuit block diagram of an embodiment of a mobile radio telephone system.

A preferred embodiment of the present invention is now explained in detail in conjunction with the accompanying drawings. FIG. 1 shows a circuit block diagram of a mobile radio telephone system in accordance with the preferred embodiment. In FIG. 1, numeral 1 denotes a car antenna for effecting communication with a base station, not shown, numeral 2 denotes a mobile radio station comprising a wireless transmitter/receiver for effecting communication with the base station, and a control unit therefor. It is connected to a car battery E. Numeral 3 denotes a telephone set which is connected to the mobile radio station 2. The telephone set 3 comprises a dial key pad 5, a handset 6, a hook switch 7 which is turned on and off by hanging off and on the handset 6, switches 8a and 8b for selecting the transmission/reception by the handset 6 or the transmission/reception by a wireless telephone transmitter 4 and a speaker 11, an amplifier 9 activated when the wireless telephone transmitter 4 is used, a transmission level detector 10, the speaker 11, an FM receiver set 12 and an antenna 13a.

The wireless telephone transmitter 4 is physically detachable from the telephone set 3 and it comprises an antenna 13b, an FM transmitter set 14, a microphone 15, a switch 16 and a primary battery 17. When the wireless telephone transmitter 4 is detached from the telephone set 3, the switch 16 closes to connect the primary battery 17 to the FM receiver set 14 containing a self-excited oscillator to permit the transmission.

Figure 2:
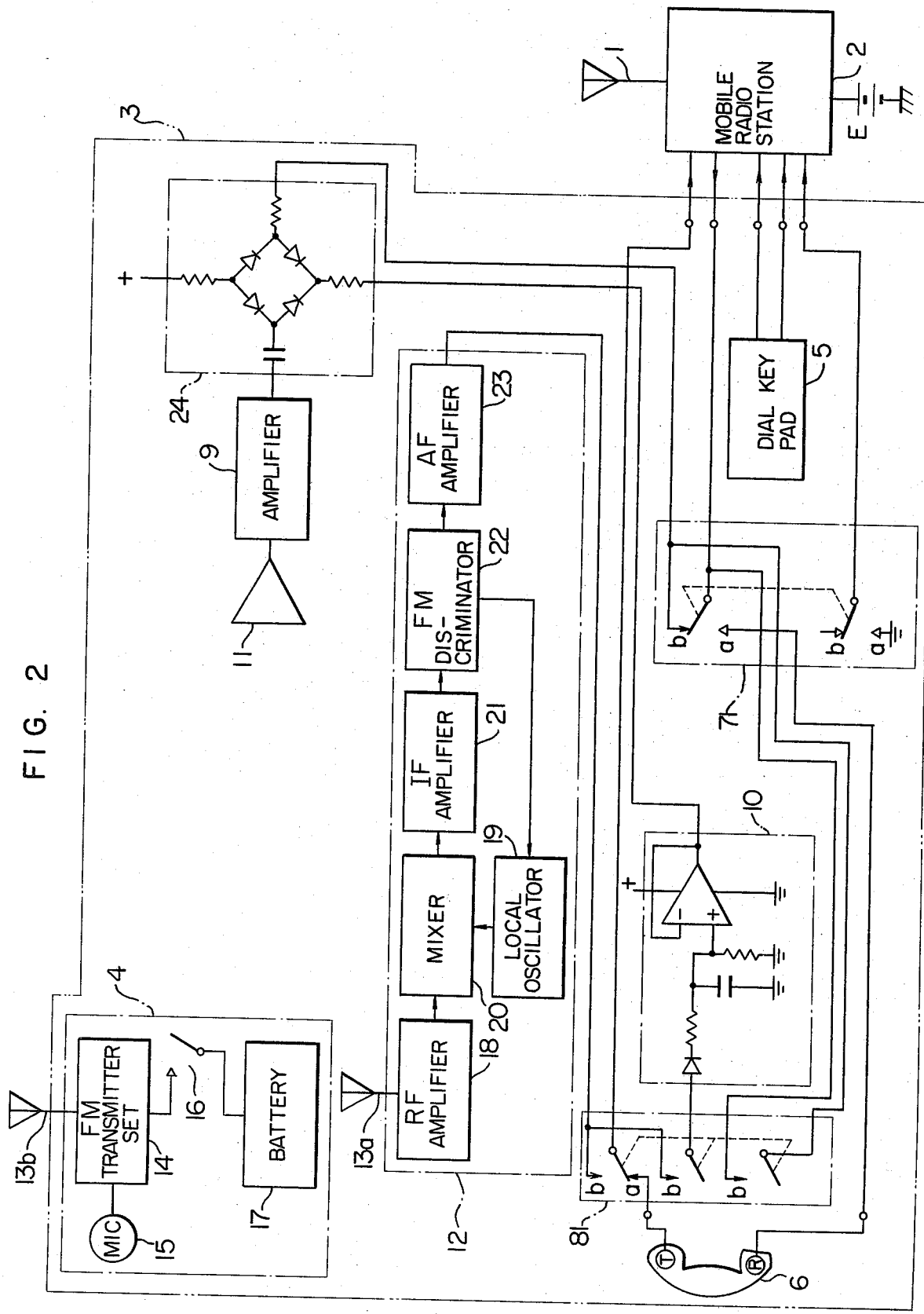
FIG. 2 shows a circuit diagram of another embodiment of a mobile radio telephone system.

FIG. 2 shows a circuit diagram of another embodiment of the mobile radio telephone system which differs from the mobile radio telephone system in FIG. 1 only in the constructions and connections of the switches 7, 8a and 8b. The same numerals and symbols indicate the like or corresponding blocks or components to those shown in FIG. 1.

In FIG. 2, the receiver set 12 to be coupled to the wireless telephone transmitter 4 comprises an RF amplifier 18, a local oscillator 19, a mixer 20, an IF amplifier 21, an FM discriminator 22 and a AF amplifier 23. A block 24 denotes a volume controller which detects sound from the wireless telephone transmitter 4 to attenuate speaker output when the telephone transmission is initiated. A switch 71 shows a hook switch corresponding to the hook switch 7 of FIG. 1. A switch 81 is for selecting the transmission/reception by the handset 6 or the transmission/reception by the wireless telephone transmitter 4 and the speaker 11.

Figure 3:
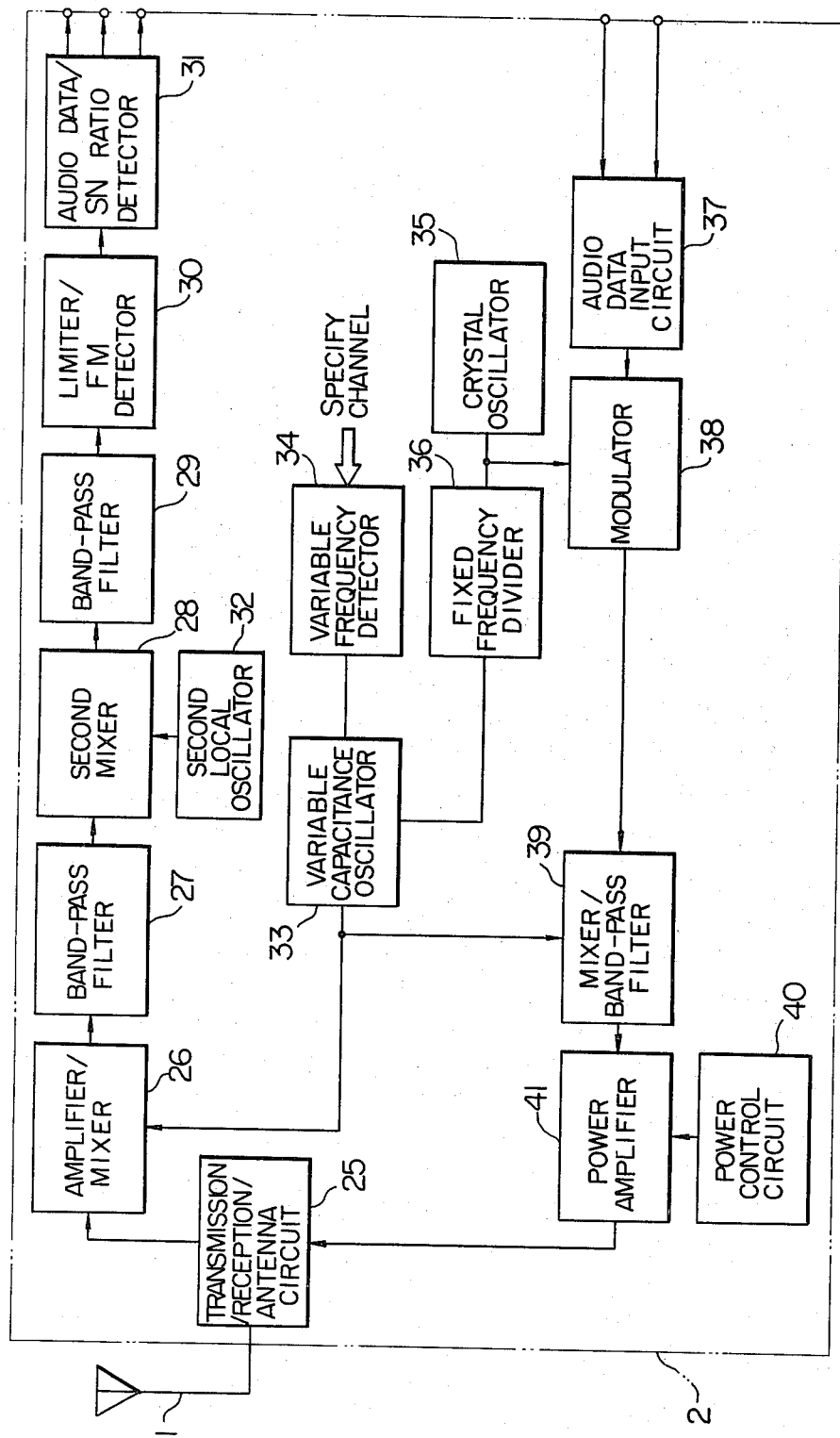
FIG. 3 shows a block diagram illustrating a configuration of a mobile radio station in FIGS. 1 or 2.

FIG. 3 shows a more detailed configuration of the mobile radio station in FIGS. 1 and 2. It comprises a transmission/reception antenna circuit 25, an amplifier/mixer 26, a band-pass filter 27, a second mixer 28, a band-pass filter 29, a limiter/FM detector 30, an audio data/SN ratio detector 31, a second local oscillator 32, a variable capacitance oscillator 33, a channel specifying directly variable frequency divider 34, a crystal oscillator 35, a fixed frequency divider 36, an audio data input circuit 37, a modulator 38, a mixer/band-pass filter 39, a power control unit 40 and a power amplifier 41.

The construction of the mobile radio telephone system of the present invention has thus been described. The operation thereof will now be explained with reference to FIGS. 1 and 2.

When the car is stopping and the telephone communication is to be done with the handset 6, the handset 6 is hooked off the hook switch 7 so that contacts of switches (8a and 8b in FIG. 1, 71 and 81 in FIG. 2) are thrown to "a" position. Thus, the telephone system operates as an ordinary radio telephone system and the communication is made through the path of handset 6→switches (8a and 8b in FIG. 1, 71 and 81 in FIG. 2)→mobile radio station 2→antenna 1.

During the driving operation, the handset 6 is hooked on so that the contacts of the switches (8a and 8b in FIG. 1, 71 and 81 in FIG. 2) are thrown to "b" position. As a result, the mobile radio station 2 is connected to an intervehicle radio transmission/reception circuitry including the wireless telephone transmitter and the speaker. In this case, the wireless telephone transmitter 4 is detached from the telephone set 3 and hung near the driver's mouth (for example, fixed at driver's chest by a clip) so that the driver can transmit. Thus, during the driving operation, the driver may speak to the microphone 15 placed near the driver's mouth and the sound received by the microphone 15 is converted to a weak radio frequency signal by the FM transmitter set 14 and the transmission is made through the mobile radio station via the path of antenna 13b→antenna 13a→receiver set 12→transmission level detector 10→switch (8b in FIG. 1, 81 in FIG. 2). The receiving signal received through the mobile radio station is applied to the path of mobile radio station 2→switch (8a in FIG. 1, 71 in FIG. 2)→amplifier 9→speaker 11 so that the driver can listen to the sound from the speaker 11 associated with the telephone set 3.

The transmission level detector 10 detects the transmission sound level from the wireless telephone transmitter 4 and a noise level in the car to control the volume control unit 24 so as to prevent the sound from the speaker 11 going through to the wireless telephone transmitter. In this manner, the transmission level detector 10 controls the gain of the amplifier 9 so that a proper sound level is attained.

When the driver wants to call a telephone subscriber, the driver stops to drive the car and dials the number of the subscriber by the dial key pad 5. After a channel has been established through the mobile radio station 2, the driver can communicate in the manner described above.

As is seen from the preferred embodiment described above, the mobile radio telephone system of the present invention uses, in addition to the handset associated with the telephone set, the wireless telephone transmitter detachable from the telephone set and the speaker serving as the telephone receiver, which is contained in the telephone set. The transmission/reception functions of the handset and the wireless telephone transmitter/-self-contained speaker are switched by the position of the hook switch which is controlled by the handset so that the driver can communicate while he or she is driving a car, without handling the handset and hence without being disturbed during driving of the car. Furthermore, the sound from the speaker is effectively prevented from going through the transmitter and the high sensitivity communication is attained. Also, even when the wireless telephone transmitter 4 is used outside the car, it is possible to communicate through the telephone system in the car.

I claim:

1. A mobile radio telephone system including a telephone set which is capable of communicating with an external telephone subscriber through a mobile radio station, said telephone set comprising:

a wireless telephone transmitter energized and enabled to transmit a signal when said wireless telephone transmitter is detached from said telephone set;

a transmitter/receiver circuit for receiving a transmitted signal from said wireless telephone transmitter, transmitting the received signal to said external telephone subscriber through a switch and said mobile radio station and receiving a transmitted signal through said mobile radio station and said switch from said external telephone subscriber;

a speaker coupled to said transmitter/receiver circuit for reproducing said signal received from said external telephone subscriber into sound;

a handset for transmitting a signal to said external telephone subscriber through said switch and said mobile radio station and receiving a transmitted signal through said mobile radio station and said switch from said external telephone subscriber thereby reproducing the received signal into sound; and said switch being controlled by a hook switch of said telephone set in response to said handset being on or off-hook for connecting said mobile radion station to said handset when said handset is off-hook and to said transmitter/receiver circuit when said handset is on-hook, whereby a driver of a vehicle can communicate with said external telephone subscriber while driving the vehicle either with said handset being on or off-hook.

2. A mobile radio telephone system according to claim 1, wherein said wireless telephone transmitter includes a power supply battery, an FM transmitter set having a microphone and an antenna, and a power switch to be automatically closed and supplying electric power from said power supply battery to said FM transmitter set when said wireless telephone transmitter is detached from said telephone set.

3. A mobile radio telephone system according to claim 1, wherein said transmitter/receiver circuit includes a super-heterodyne receiver for receiving the transmitted signal from said wireless telephone transmitter.

4. A mobile radio telephone system according to claim 1, wherein said transmitter/receiver circuit includes a volume control unit for attenuating the received signal from said external telephone subscriber upon the detection of the signal from said wireless telephone transmitter.

5. A mobile radio telephone system including a telephone set which is capable of communicating with an external telephone subscriber through a mobile radio station, said telephone set comprising:

a wireless telephone transmitter automatically energized and enabled to transmit a signal when said wireless telephone transmitter is detached from said telephone set;

a receiver circuit for receiving said transmitted signal from said wireless telephone transmitter and transmitting the received signal to said external telephone subscriber through said mobile radio station;

an amplifier circuit for receiving and amplifying a transmitted signal applied from said external telephone subscriber through said mobile station;

a speaker coupled to said amplifier circuit for reproducing said signal received from said external telephone subscriber into sound;

a handset for transmitting a signal to said external telephone subscriber through said mobile radio station and receiving a transmitted signal from said external telephone subscriber through said mobile radio station thereby reproducing the received signal into sound;

a first switch for connecting an input of said mobile radio station to an output of said receiver circuit and a transmitter of said handset in response to on-hook and off-hook of said handset respectively; and a second switch for connecting an output of said mobile radio station to an input of said amplifier circuit and a receiver of said handset in response to on-hook and off-hook of said handset respectively, whereby a driver of a vehicle can communicate with said external telephone subscriber while driving the vehicle either with the handset being on or off-hook and the received signal from said external telephone subscriber is prevented from being transmitted from said speaker to said wireless telephone transmitter when said handset is on-hook.

* * * * *